United States Patent [19]

Troccaz

[11] 4,093,325
[45] June 6, 1978

[54] TUBULAR SPINDLE MOUNTING FOR BICYCLE BOTTOM-BRACKET HUB

[75] Inventor: Roger Troccaz, Annecy, France

[73] Assignee: Societe Nouvelle de Roulements, Annecy, France

[21] Appl. No.: 737,003

[22] Filed: Oct. 29, 1976

[30] Foreign Application Priority Data

Oct. 30, 1975 France .................... 75 33142

[51] Int. Cl.² ............................................. F16C 33/00
[52] U.S. Cl. ................................. 308/192; 74/594.1
[58] Field of Search ................... 308/188, 189 R, 190, 308/191, 192; 29/149.5 R, 516; 74/594.1, 594.2

[56] References Cited

U.S. PATENT DOCUMENTS

| | | | |
|---|---|---|---|
| 607,055 | 7/1898 | Knape | 308/192 |
| 1,414,270 | 4/1922 | Fry | 308/192 |
| 3,590,464 | 7/1971 | Wildi | 29/516 |
| 3,858,942 | 1/1975 | Humlong | 308/192 |

*Primary Examiner*—Trygve M. Blix
*Assistant Examiner*—D. W. Keen
*Attorney, Agent, or Firm*—Fleit & Jacobson

[57] ABSTRACT

Bottom bracket hub comprising a hollow spindle with two ball-bearings, said spindle having a relatively thin wall, and mountings permitting the axial adjustment of said spindle; a pair of ball-bearings are mounted on said spindles and a pair of inserts are fitted into the ends of said spindle. Alternatively, the inner races of said bearings are formed by cold-rolling the outer surface of said hollow spindle.

3 Claims, 6 Drawing Figures

U.S. Patent   June 6, 1978   4,093,325 ed. 2. The assumed ball-bearings 102 are fitted in bushings 103, 104 screwed in the hub body 114 and formed with screw-threaded outer surfaces to permit the axial adjustment as already described hereinabove with reference to FIG. 1. The left-hand ball-bearing 102, as seen in the Figure, is adapted to move freely in the bore of its bushing 104
TUBULAR SPINDLE MOUNTING FOR BICYCLE BOTTOM-BRACKET HUB This invention relates to a bottom-bracket spindle mounting, notably for bicycles, which comprises a bottom bracket body in which a spindle carrying a pair of rolling-contact bearings is fitted, each bearing comprising an outer race.

In a spindle mounting of this type, the solid spindle is relatively heavy and the external bearing race is fitted in a cylindrical cavity closed by a washer limiting the axial movements of the spindle.

With this conventional construction, the bearing play must necessarily be adjusted when fitting the bearings in the bottom bracket body. The proper operation and useful life of the bearings are subordinate to this delicate, accurate operation. Though this operation can be performed under the best possible conditions when using adequate means in the mass-production of bicycles, the same does not apply in case of current repair and maintenance operations performed by small craftsmen, shop keepers or the users themselves, who seldom possess the necessary precision tool means. Obviously, the bearing play resulting from an adjustment left to the initiative and appreciation of an unskilled repairer is most likely to impair the proper operation and useful life of the bearings. In fact:

an insufficient or negative play as observed in pre-stressed bearings will generate abnormally high contact pressures between the balls and the relevant races, thus creating fatigue spots in the metal and deteriorating these components;

an excessive play, on the other hand, will permit the axial movement of the balls in their races, thus causing a detrimental overheating leading to a distortion of the contact surfaces.

It is the essential object of the present invention to provide a light-weight bottom bracket spindle mounting for bicycles and the like, wherein the main spindle is a tubular hollow member adapted to be adjusted longitudinally in relation to the bottom bracket body without altering the bearing operating plays. According to this invention, the spindle consists of a tubular member of relatively moderate wall thickness which has fitted in its two ends a pair of inserts fixed to said tubular member. According to another feature characterising this invention, the outer races of the bearings are disposed in two screw-threaded bushings, respectively, at least one of these bushings being adapted to move axially in relation to the bearing race enclosed therein, said bushing being screwed in turn in the tapped body of the bottom bracket.

In the bottom bracket bearing construction thus obtained, the axial position of the spindle and therefore the play can be modified by rotating the bearing-supporting bushing without altering the relative position of the bearings with respect to the axis. This adjustment is particularly advantageous for properly aligning the chain wheel with the free wheel without any risk of distorting the transmission chain.

Other features and advantages of this invention will appear as the following description proceeds with reference to two different forms of embodiment of the bottom bracket hub of this invention, given with reference to the attached drawing, in which.

Figure 1:
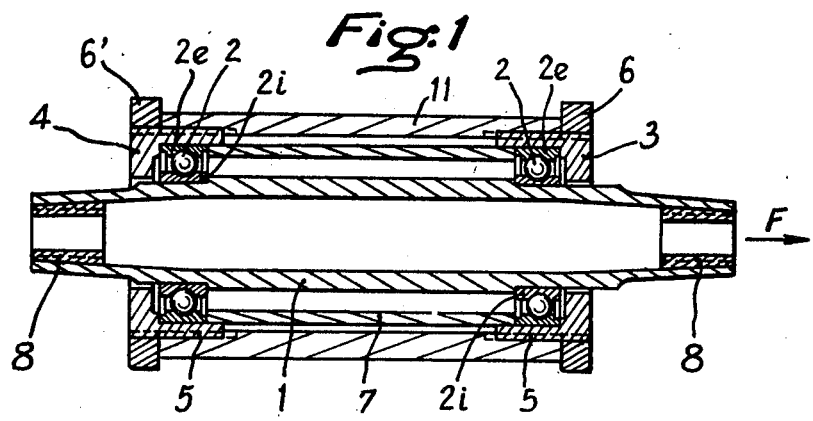
FIG. 1 illustrates in axial section the bottom bracket hub construction according to a first form of embodiment.

The bottom bracket hub for bicycle which is illustrated in FIG. 1 comprises a hollow tubular spindle 1 obtained from a tubular blank of relatively reduced thickness consisting of a high-resilient, low-density material and having force-fitted thereon the inner races 2i of a pair of a pair of sealed ball-bearings 2 engaging a pair of shoulders formed on the spindle 1. The outer races 2e of these bearings are fitted in a pair of corresponding screw-threaded bushings 3, 4 of which the outer surface is screw-threaded as shown at 5 for engagement with the relevant tapped end of the hub body 11. A tube 7 having a length consistent with the relative spacing of the two shoulders 2 formed on spindle 1 constitutes a distance-piece between the bearings 2. A pair of nuts 6, 6' are screwed on the screw-threaded portions 5 of bushings 3, 4 and adapted to lock these bushings 3, 4 after properly adjusting the spindle 1.

This spindle 1 is adjusted as follows. Firstly, the nuts 6, 6' are removed and the bushing 3, for instance, is screwed out a few turns, so that this bushing will move towards the corresponding end of spindle 1. The play thus obtained between the outer race 2e and the bushing 3 permits the movement of spindle 1 and bearings 2 in the direction of the arrow F to an extent corresponding to said play. It is then only necessary to take up the play created between the outer race 2e and the bushing 4 by screwing-in this bushing through an equivalent number of turns.

Figures 3, 4, 5, 6:
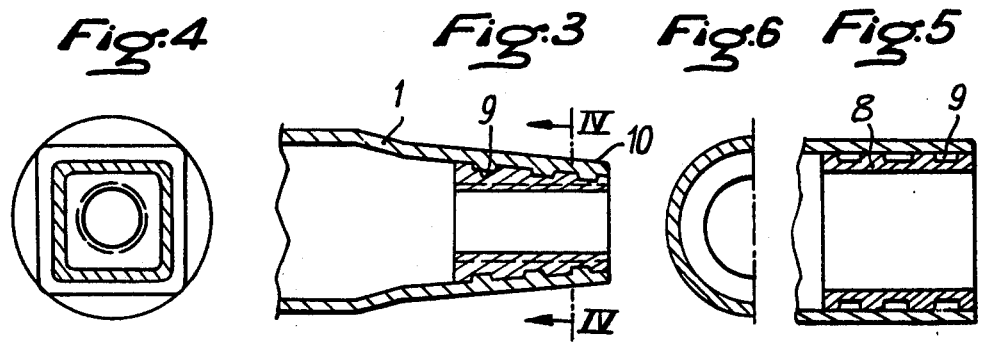
FIG. 3 is a section showing on a larger scale one end of the hub spindle.
FIG. 4 is a cross-section taken along the line IV—IV of FIG. 3.
FIGS. 5 and 6 are sections showing the end portion of the spindle during one step of its manufacture.

According to a typical feature characterising this invention, the two ends 10 of the tubular spindle 1 carry each a drilled and tapped insert rigid with said spindle 1 and provided with peripheral grooves 9. These inserts 9 are introduced prior to the tapping operation into the two ends 10 of spindle 1, as illustrated in FIG. 5. After inserting a punch into the insert, the cross-section of both ends 10 is reduced in a press until the grooves 9 are filled with the material of spindle 1, and until the spindle end 10 assumes the appearance of a truncated pyramid, with a view to facilitate the mounting and adjustment of the pidal-supporting cranks (not shown). Thus, the rigid assembly described with reference to FIGS. 3 and 4 is obtained. Then, the inserts 9 are tapped as illustrated in FIGS. 3 and 4.

Figure 2:
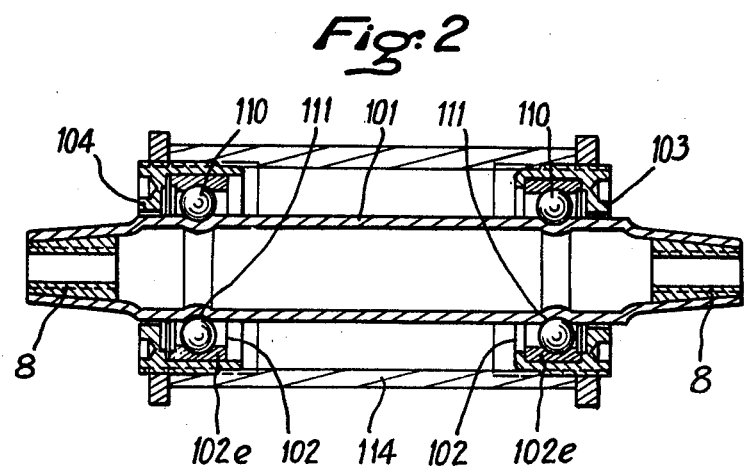
FIG. 2 illustrates also in axial section the hub construction according to a modified form of embodiment.

FIG. 2 illustrates a modified form of embodiment of the bottom bracket spindle mounting or hub which comprises a tubular spindle 101 having the inner races 111 of balls 110 stamped therein by a cold-rolling operation. Thus, the spindle 101 constitutes the common inner race of pair of sealed bearings 102 having standard outer races 102e. The pair of identical ball-bearings 102 thus obtained are fitted in bushings 103, 104 screwed in the hub body 114 and formed with screw-threaded outer surfaces to permit the axial adjustment as already described hereinabove with reference to FIG. 1. The left-hand ball-bearing 102, as seen in the Figure, is adapted to move freely in the bore of its bushing 104 whereas the right-hand ball-bearing 102 is locked by the other bushing 103.

With this assembly, the spindle 101 can be adjusted for axial play by means of bushing 103. In fact, it is clear that moving the bushing 103 axially will also move the spindle 101 in the same direction, provided that an axial assembly play is provided between the outer bearing race and the bushing 104.

The spindle ends are also provided with inserts made as described hereinabove with reference to FIGS. 3 – 5.

What is claimed as new is:

1. Bottom bracket hub of the ball-bearing type, comprising a hollow tubular spindle of relatively reduced wall thickness, means for effecting the axial adjustment of said spindle, a pair of bearings associated with, and mounted on, said spindle, and a pair of inserts rigidly fitted in the hollow ends of said spindle, wherein the hub body receives therethrough the hollow tubular spindle carrying the two bearings each provided with an outer race, characterised in that the outer races of said bearings are disposed in a pair of screw-threaded bushings, respectively, of which at least one is adapted to move axially in relation to the outer race of the relevant bearing, said bushings constituting the axial play adjustment members and being on the other hand screwed in the tapped body of said hub.

2. Bottom bracket hub, as set forth in claim 1, wherein the outer races of said bearings are mounted for movement bodily with said tubular spindle in relation to a bushing in case of axial movement of another bushing towards the end of said spindle.

3. Bottom bracket hub of the ball-bearing type, comprising:
   a hub body;
   a hollow tubular spindle of relatively reduced wall thickness axially adjustable within said hub body;
   means for effecting the axial adjustment of said spindle;
   a pair of bearings associated with, and mounted on said spindle;
   a pair of tapped inserts rigidly fitted in the hollow ends of said spindle;
   a pair of screw-threaded bushings mounted for axial movement in said hub body; and
   outer races for said bearings being disposed in said screw-threaded bushings, each of said outer races being movable in one direction by the movement of its associated bushing and being movable in an opposite direction by the movement of the other bushing, the hub body receiving therethrough the hollow tubular spindle carrying the two bearings in such manner that movement of said outer races by said bushings provides axial adjustment of said spindle.--

* * * * *